United States Patent [19]

Beck

[11] 4,391,450

[45] Jul. 5, 1983

[54] SHAFT SEAL RESISTANT TO ELECTROKINETIC CORROSION

[75] Inventor: Theodore R. Beck, Seattle, Wash.

[73] Assignee: Electrochemical Technology Corp., Seattle, Wash.

[21] Appl. No.: 412,709

[22] Filed: Aug. 30, 1982

[51] Int. Cl.³ .................. F16J 15/16; F16J 15/34
[52] U.S. Cl. ...................... 277/1; 277/96.1; 277/96.2; 277/93 SD; 277/237 R; 277/DIG. 6; 277/901
[58] Field of Search .............. 277/81 R, 96, 96.1, 277/96.2, 901, 236, DIG. 6, 237, 1, 93 R, 93 SD

[56] References Cited

U.S. PATENT DOCUMENTS

| | | |
|---|---|---|
| 2,299,813 | 10/1942 | Franks ............................ 277/901 X |
| 2,425,209 | 8/1947 | Snyder et al. .................... 277/96.2 |
| 2,752,579 | 6/1956 | Caldwell et al. ............... 277/901 X |
| 3,601,413 | 8/1971 | Darnell ............................ 277/96.2 |
| 3,747,944 | 7/1973 | Roy et al. . |
| 3,903,959 | 9/1975 | Fushimi et al. . |
| 3,930,071 | 12/1975 | Rao et al. . |
| 4,060,250 | 11/1977 | Davis et al. ............. 277/DIG. 6 X |
| 4,148,494 | 4/1979 | Zelahy et al. ........... 277/DIG. 6 X |
| 4,205,858 | 6/1980 | Shimazaki et al. . |

FOREIGN PATENT DOCUMENTS

926435 9/1970 Canada .
1434365 5/1972 United Kingdom .

OTHER PUBLICATIONS

T. R. Beck, et al., *Am. Soc. Mech. Eng. J. Basic Eng.*, vol. 92, Dec. 1970, p. 782-791.
T. R. Beck, et al., *J. Electrochem Soc.*, vol. 119, No. 2, Feb. 1972, pp. 155-160.

*Primary Examiner*—Robert S. Ward, Jr.
*Attorney, Agent, or Firm*—Merriam, Marshall & Bicknell

[57] ABSTRACT

A shaft rotatably mounted within a housing. The shaft extends through a pair of annular seal elements one of which is mounted on the shaft for rotation therewith. The other seal element is associated with the housing and is stationary relative to the shaft. The seal elements have respective mating surfaces which rub together during rotation of the shaft. One seal element is composed of relatively hard material, and the other seal element is composed of relatively soft material so that the mating surface of the latter is conformed to the mating surface of the former when the two mating surfaces are initially rubbed together. There is a minute gap between the mating surfaces, and this gap contains a film of liquid which acts as a lubricant. Both seal elements are composed of a material which will not support an electrochemical reaction, e.g., an electrically insulating material, to prevent electrokinetic corrosion of the mating surfaces when the film therebetween is an electrolytic liquid.

15 Claims, 3 Drawing Figures

SHAFT SEAL RESISTANT TO ELECTROKINETIC CORROSION

BACKGROUND OF THE INVENTION

The present invention relates generally to mechanical shaft seals, and more particularly to a mechanical shaft seal which is resistant to electrokinetic corrosion.

Electrokinetic corrosion is defined and discussed in an article by T. R. Beck, et al., *Am. Soc. Mech. Eng. J. Basic Eng.*, Vol. 92, December, 1970, at p. 782, and the definition therein is incorporated herein by reference.

Electrokinetic corrosion of a solid member can occur when there is acceleration of an adjacent liquid in which electrokinetic streaming currents ($I_s$) or static electricity are generated. This will be discussed in greater detail below.

A shaft seal is generally employed in connection with a shaft and a housing within which the shaft rotates. Part of the shaft is immersed in liquid. There is a clearance between the outside of the shaft and the inside of the housing, and the shaft seal is used to prevent the leakage of liquid through that clearance.

The shaft seal generally comprises a stationary first annular seal element associated with the housing and through which the shaft extends. A second annular seal element is fixedly mounted on the shaft for rotation therewith. Each of the seal elements has a respective mating surface, and spring means are employed to urge the mating surfaces together to provide rubbing engagement between the mating surfaces during rotation of the shaft. The shaft seal is generally non-load-bearing.

Large shaft seals are exemplified by those used in connection with submarine shafts, which may have a diameter of about two feet, for example. The liquid (sea water) adjacent a submarine shaft seal can be under tremendous pressure, depending upon the depth to which the submarine is submerged. In conventional submarine shaft seals, one of the seal elements has been made from a relatively hard material, such as silicon carbide, and the other seal element has been made of a relatively soft or conforming material, such as graphite. When the mating surfaces of the two seal elements rub together initially during rotation of the shaft, the relatively hard silicon carbide sealing element abrades the mating surface of the relatively soft graphite second seal element until the mating surface on the graphite seal element conforms to the mating surface on the silicon carbide seal element, so that there are no irregularities on the two mating surfaces, in relation to each other, on a macro scale. (As used herein, the term macro scale refers to an irregularity having a depth or height of about $1 \times 10^{-5}$ meter or larger.) Thus, the mating surfaces on such a shaft seal are quite uniform in relation to each other, on a macro scale.

When an electrolytic liquid undergoes movement in relation to an adjoining surface, an electrokinetic streaming current is generated in the moving liquid. This streaming current is proportional to certain electrical characteristics of the liquid and to the shear rate or velocity gradient of the liquid relative to the surface alongside which the liquid moves.

In a mechanical shaft seal, such as a submarine shaft seal of the type described above, there is a very small gap between the mating surfaces of the shaft seal, and this gap is less than about $1 \times 10^{-6}$ meter (1 micrometer). The gap contains a liquid film of sea water, which acts as a lubricant for the mating surfaces during rotation. The film of sea water has characteristics which allow an electrokinetic streaming current to be generated when the liquid film moves relative to one of the mating surfaces. When the submarine shaft is rotated, this causes movement of the liquid film relative to the two mating surfaces, and there is a velocity gradient in the moving liquid relative to each of the two mating surfaces, resulting in the generation of an electrokinetic streaming current.

As previously noted, electrokinetic corrosion occurs only when the liquid in which electrokinetic streaming currents are generated undergoes acceleration. Because the two mating surfaces in a submarine shaft seal of the type described above are relatively smooth, one would expect the velocity of the liquid at any given plane in the gap between the two mating surfaces to be relatively constant and that the liquid would not, therefore, undergo acceleration. Accordingly, even though electrokinetic streaming currents are generated in the sea water film between the two mating surfaces of a submarine shaft seal of the type described above, because one would not expect that liquid to undergo acceleration, one would also not expect electrokinetic corrosion on either of the mating surfaces of the shaft seal.

However, although the mating surfaces of the submarine shaft seal are relatively smooth, are uniform in relation to each other and have no irregularities on a macro scale, they are not absolutely geometrically smooth, and they do have local irregularities on a micro scale, i.e., irregularities having a depth or height substantially smaller than $1 \times 10^{-5}$ meter (e.g., $1 \times 10^{-6}$ meter or less). These local irregularities, on a micro scale, are sufficient to cause some acceleration in the liquid undergoing movement relative to the two mating surfaces, in turn producing a current density which is normal or perpendicular to the walls or mating surfaces of the shaft seal. This normal current density ($i_n$) has two components. One of these components is fluid conduction current ($i_f$) and the other component, in the case of a seal element composed of a conductive material such as graphite or metal, is wall current ($i_w$). The presence of wall current can cause electrokinetic corrosion of the wall or mating surface adjacent the liquid undergoing acceleration, and this in time can produce sufficient wear on that mating surface eventually to allow leakage of liquid through the shaft seal.

In a conventional submarine shaft seal of the type described above, there is sufficient wear under normal usage to produce a leakage in about 2-12 months, whereas several years of service without leakage is desired.

SUMMARY OF THE INVENTION

The present invention employs a mechanical shaft seal in which one of the two sealing elements is composed of a relative hard material, such as silicon carbide, and the other seal element is composed of a relatively soft, conforming material. Therefore, when the two mating surfaces rub together during rotation of the shaft, the mating surface on the seal element composed of the softer material conforms to the mating surface on the seal element composed of the relatively hard material. This, of course, eliminates any irregularities in the mating surfaces, on a macro scale.

In addition, the present invention recognizes that, although the two mating surfaces are relatively smooth and uniform, on a macro scale, there can still be local irregularities on a micro scale, and these local irregularities can result in electrokinetic corrosion when the gap between the two mating surfaces contains a film of conductive liquid such as sea water. To overcome this problem, in accordance with the present invention, the two sealing elements are composed of materials that are electrically insulating and non-conductive or which will not support an electrochemical reaction either at all or beyond a brief initial stage. Accordingly, when current densities normal to the mating surfaces are generated due to acceleration of the liquid film, the normal current density ($i_n$) is composed entirely of fluid conduction current ($i_f$) and there is no wall current component ($i_w$). Absent the wall current ($i_w$), there can be no electrokinetic corrosion.

Other features and advantages are inherent in the structure claimed and disclosed or will become apparent to those skilled in the art from the following detailed description in conjunction with the accompanying diagrammatic drawing.

DETAILED DESCRIPTION

Figure 1:
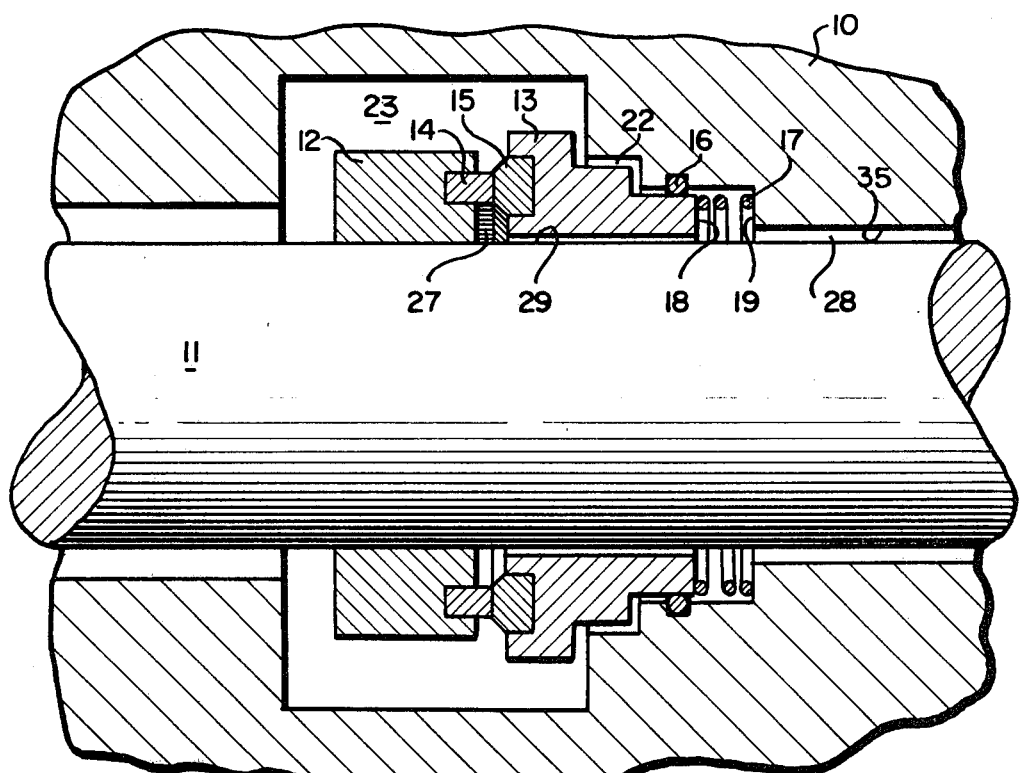
FIG. 1 is a fragmentary sectional view illustrating a mechanical shaft seal of a type which employs an embodiment of the present invention.
Figure 2:
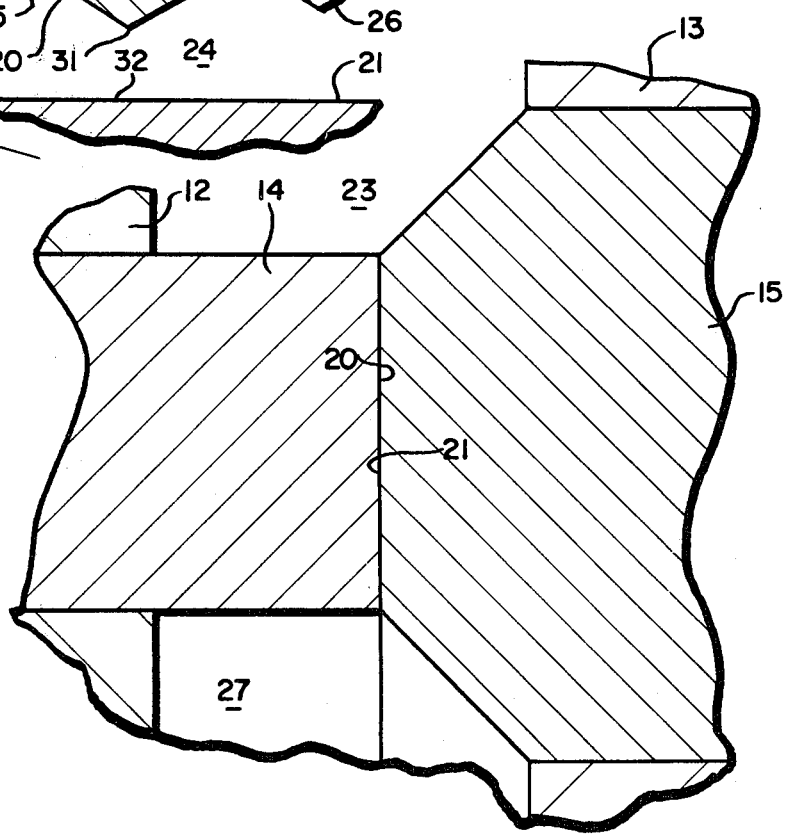
FIG. 2 is an enlarged fragmentary view of the shaft seal of FIG. 1.

Referring initially to FIGS. 1 and 2, indicated at 10, is a housing within which rotates a shaft 11. Housing 10 includes a bore 31 through which shaft 11 extends. There is a clearance 28 between the outside of shaft 11 and the inside of bore 35. The shaft is rotatably mounted on bearings of conventional construction located to the right of the structure illustrated in FIG. 1.

Fixed on shaft 11 is a first annular mounting member 12 which rotates with the shaft. Associated with housing 10 is a second annular mounting member 13, which is stationary relative to shaft 11. Mounting member 13 includes a bore 29 through which shaft 11 extends.

Fixedly mounted on first mounting member 12 is a first annular seal element 14, and fixedly mounted on second mounting member 13 is a second annular seal element 15. First seal element 12 rotates with shaft 11, and second seal element 15 is stationary relative to shaft 11. Shaft 11 extends through second annular seal element 15. There is an enlarged space 23 within housing 10 which accommodates mounting elements 12, 13 and their respective seal elements 14, 15.

First seal element 14 has a mating surface 20, and second seal element 15 has a mating surface 21 (FIG. 2). The mating surfaces 20, 21 rub against each other during rotation of shaft 11 within housing 10.

Second mounting member 13 has a front surface 18, and housing 10 has a shoulder surface 19. Located between surfaces 18 and 19 is a coil spring 17 which urges second mounting member 13 toward first mounting member 12 and also urges mating surfaces 20, 21 together to provide rubbing engagement between the two mating surfaces during rotation of shaft 11.

There is a gap between second mounting member 13 and housing 10. Located in gap 22 is an O-ring 16 which prevents leakage of liquid from one side of the O-ring 16 to the other.

Seal elements 14, 15 prevent leakage from one side thereof to the other. For example, assuming that there is liquid around shaft 11 on the left-hand side thereof, as viewed in FIG. 1, seal elements 14, 15 prevent that liquid from leaking to a position around shaft 11 on the right-hand side thereof as viewed in FIG. 1. Typically, the structure illustrated in FIG. 1 is used to prevent leakage around a submarine shaft, in which case the liquid whose leakage is being prevented would be sea water. For example, the propeller end of the shaft would be to the left as viewed in FIG. 1 and the power plant would be to the right as viewed in FIG. 1. Sea water would enter housing space 23 from the left as viewed in FIG. 1, and the annular seal structure 14, 15 would prevent passage of the sea water from space 23, on the outside of the seal structure, to a space 27 on the inside of that seal structure.

Both seal elements 14, 15 are composed of materials which are electrically insulating or nonconductive or will not support an electrochemical reaction either at all or after a brief initial stage.

First seal element 14 is composed of a smooth material having a relatively high hardness, such as silicon carbide, or a material having a hardness approaching that of silicon carbide. Silicon carbide is a poor electronic conductor, and it forms a layer of silicon dioxide on its surface which, after a brief initial stage, protects seal element 14 from further electrochemical reaction.

Second seal element 15 is typically composed of a material having a relatively low hardness, compared to that of silicon carbide, e.g., boron nitride or a material having a hardness substantially approaching that of boron nitride. Boron nitride is an insulator.

Other materials from which the first seal element may be composed are corundum ($Al_2O_3$), fused quartz and equivalents thereof. Other materials of which the second seal element may be composed include a composite material comprising a matrix of boron nitride with particles of graphite dispersed in the matrix. In such a composite material the boron nitride constitutes at least about 80 wt.% thereof. If the composite material contains substantially less than 80 wt.% boron nitride, the graphite content would be large enough to pose a danger of electrokinetic corrosion.

The composite material described in the preceding paragraph may also contain a small amount of polytetrafluoroethylene as a replacement for some or all of the graphite. In no event should the graphite be present in an amount large enough to pose a danger of electrokinetic corrosion (i.e., greater than about 20 wt.%).

Composite materials contemplate the use of hot pressed boron nitride which is relatively porous, and the ingredients in the composite material help offset the porosity. There is a relatively non-porous boron nitride, called pyrolytic boron nitride, which is preferable for use when the second seal element is to be composed of boron nitride alone. Pyrolitic boron nitride is sold by Union Carbide Corporation under the trademark Boralloy. The material is synthesized as a vapor employing a high temperature, low pressure process in which boron nitride vapor is deposited out on a precision graphite mandrel as a high purity, high temperature-resistant solid article which gradually attains the desired thickness as deposition continues. The resulting material is an opaque, white, non-toxic, non-porous compound which is 99.99% pure boron nitride with hexagonal crystals having a parallel crystalline orientation which approaches 1,000 to 1.

Because first seal element 14 is composed of a relatively hard, smooth material and second seal element 15 is composed of a relatively soft material, when the mating surfaces of the two seal elements are initially rubbed together during rotation of the shaft, the mating surface 21 on second element 15 will be conformed to the mating surface 20 on first seal element 14, on a macro scale. In other words, the two surfaces appear to conform to each other, without local surface irregularities on a macro scale on any part of either mating surface, compared to the facing part on the other mating surface, and any given part of one mating surface appears to be parallel to the opposed part of the other mating surface.

The harder of the two sealing elements should preferably have a hardness of about 7 or harder on the Moh scale. The Moh scale is described in Lange, Handbook of Chemistry, 10th edition, McGraw-Hill Book Company, New York, 1961, at page 150, and a Moh hardness of 7 is stated to be "little touched by file, but will scratch window glass." The softer of the two sealing elements should preferably have a hardness of no more than about 2 on the Moh scale which is described in Lange as "easily scratched by finger nail." Other hardness values may be acceptable for the two sealing elements so long as the relative difference in hardness between the two sealing elements is sufficient to allow the harder sealing element to readily conform the softer sealing element to the harder one.

In addition to being composed of materials having the relative hardnesses described above, both seal elements 14 and 15 are composed of electrically insulating material or of a material which will not support an electrochemical reaction either at all or beyond a brief initial stage. As a result, there is substantially eliminated the danger of electrokinetic corrosion at either of the two mating surfaces 20, 21. The problem of electrokinetic corrosion will be discussed more fully below in connection with FIG. 3.

Figure 3:
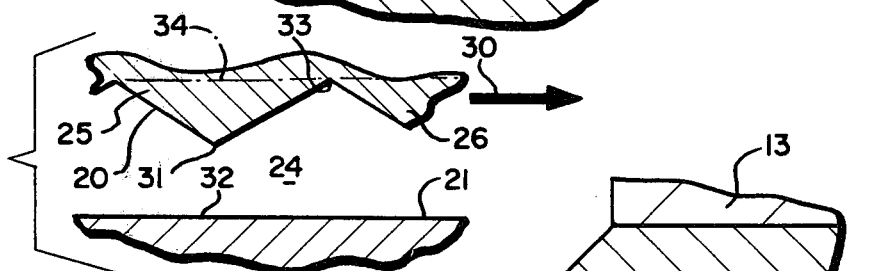
FIG. 3 is an idealized illustration, in section, of the two mating surfaces of the shaft seal, on a micro scale.

FIG. 3 illustrates, on a micro scale, an idealized version of mating surfaces 20, 21. Mating surface 21 is shown as absolutely smooth in the area depicted in the figure, while mating surface 20 is shown as having localized inverted, mound-like irregularities 25, 26 having a triangular cross-section. The gap between the two mating surfaces is filled with a very thin film 24 of liquid which acts as a lubricant between mating surfaces 20, 21. The gap between the two mating surfaces is measured between the closest points thereon, which would be the tip 31 of the deepest inverted mound 25 and the opposite point 32 on mating surface 21.

The depth of inverted mound 25 would determine whether the irregularity is a micro-irregularity or macro-irregularity. The depth of inverted mound 25 is the perpendicular distance between tip 31 and a line 34 through the valley 33 between inverted mounds 25, 26. If the depth of inverted mound 25 is, for example, $1 \times 10^{-5}$ meter or larger, mound 25 would be a macro-irregularity. If the depth of inverted mound 25 is, for example, $1 \times 10^{-6}$ meter or less, the mound is a micro-irregularity.

If the gap between the two mating surfaces (i.e., between tip 31 and point 32) exceeds $1 \times 10^{-6}$ meter, leakage may occur. When the two mating surfaces have been conformed in the manner described above so that they are smooth and uniform, on a macro scale, the gap between the two mating surfaces should be no greater than about $1 \times 10^{-6}$ meter, and there will be no leakage. However, if this gap is enlarged, as by electrokinetic corrosion, leakage will occur.

Liquid film 24 generally has a thickness less than 1 micrometer ($1 \times 10^{-6}$ meter), e.g., 10–1,000 Angstroms ($1 \times 10^{-9} - 1 \times 10^{-7}$ meters).

Mating surface 20 and its associated seal element 14 rotate with shaft 11 in the direction of arrow 30 in FIG. 3. As first seal element 14 rotates in the direction of arrow 30 it produces a movement on the part of liquid film 24 in relation to both seal elements 14 and 15, and the speed of this movement varies through the liquid film with the distance from a mating surface. More particularly, rotation of seal element 14 induces movement in liquid film 24 in the same direction 30 as element 14 moves, but at a slower speed. This has the same effect as if element 14 were stationary and liquid film 14 were moving in the opposite direction at a speed equal to the actual velocity differential between seal element 14 and film 24. Therefore, there is apparent movement of film 24, in a direction opposite to arrow 30, relative to seal element 14 and its mating surface 20. On the other hand, seal element 15 is stationary while film 25 is moved in direction 30 by seal element 14, so that there is actual movement of film 24 in direction 30 relative to seal element 15 and its mating surface 21.

Film 24 is composed of an electrolytic liquid, such as sea water, and an electrokinetic streaming current is generated in film 24 as it undergoes movement relative to sealing elements 14 and 15. The electrokinetic streaming current ($I_s$) is dependent upon not only the characteristics of the liquid of which film 24 is composed, but also upon the velocity gradient or shear rate adjacent the mating surface 20 or 21. This velocity gradient is directly proportional to the diameter of shaft 11 and the number of revolutions per second at which the shaft rotates, and is inversely proportional to the dimension of the gap between the two mating surfaces 20, 21.

If mating surface 20 were uniformly smooth, on a micro scale, like the idealized version of mating surface 21 shown in FIG. 3, both surfaces would be parallel (on a micro scale), the velocity of liquid film 24 adjacent a mating surface would be uniform along its path of relative movement, the electrokinetic streaming current would be constant and there would be no current density normal to either of the mating surfaces 20, 21 ($i_n$). Under the conditions described in the preceding sentence, there would be no electrokinetic corrosion of either of the mating surfaces 20, 21.

However, mating surfaces 20, 21 are not uniformly smooth, on a micro scale, but instead have localized micro-irregularities as at 25 on surface 20, for example, and the gap between mating surface 20 and mating surface 21 varies, as viewed from left to right in FIG. 3. Accordingly, there are localized acceleration in liquid film 24 as it undergoes movement (actual or apparent) relative to the two mating surfaces.

When liquid film 24 undergoes acceleration, there is a current density normal (i.e. perpendicular) to a given mating surface 20 or 21. The normal current density ($i_n$) comes from either the liquid, by conduction ($i_f$), or the wall defined by a mating surface, by electrochemical reactions, one of which is corrosion ($i_w$). However, if the wall defined by a mating surface is made of a material which will not support an electrochemical reaction, there can be no wall corrosion. In the embodiment under discussion, seal element 14 is composed of silicon carbide, and seal element 15 is composed of boron nitride, neither of which will support an electrochemical reaction. Thus, there can be no wall corrosion, and all of the normal wall current comes out of the fluid ($i_f$).

Although, in FIG. 3, all the localized irregularities 25, 26 are shown as being located on mating surface 20, such localized irregularities can also be present on mating surface 21. These localized irregularities become apparent only when mating surfaces 20, 21 are considered on a micro scale, i.e., the irregularities have a depth or height substantially less than $1 \times 10^{-5}$ meter. The irregularities are not apparent when the mating surfaces are considered on a macro scale, i.e., there are no irregularities having a depth or height substantially greater than $1 \times 10^{-5}$ meter. On a macro scale, the two mating surfaces 20, 21 appear to be uniformly smooth. Smoothness on a macro scale exists because one mating surface is on an element composed of relatively hard material and the other mating surface is on an element composed of relatively soft material which, upon being rubbed together with the mating surface of the relatively hard material, is conformed to the mating surface of the relatively hard material. It is only when such mating surfaces which have been conformed as described in the preceding sentence, are considered on a micro scale that the localized irregularities become apparent. It is these localized irregularities which are responsible for accelerations in the liquid film, in turn causing normal current densities ($i_n$) which in turn can cause electrokinetic corrosion in the absence of constructing the seal elements in accordance with the present invention.

Although the present invention has been described above as applicable particularly to submarine shaft seals subjected to sea water, it is also applicable to other shaft seals subjected to other electrolytic liquids where electrokinetic corrosion could be a problem.

As used herein, the term "electrolytic liquid" covers any liquid having some ionic conductivity, e.g., a liquid having a conductivity as low as $10^{-12}$ ohms$^{-1}$ centimeters$^{-1}$ or lower. An example of an electrolytic liquid near the low end of the above-noted conductivity range is detergent-containing motor oil.

The foregoing detailed description has been given for clearness of understanding only, and no unnecessary limitations should be understood therefrom, as modifications will be obvious to those skilled in the art.

I claim:

1. In combination with a shaft, a housing, and means mounting said shaft for rotation within said housing, a shaft seal for preventing the leakage of liquid between said shaft and said housing, said shaft seal comprising:
a stationary first annular seal element associated with said shaft housing;
said shaft extending through said first annular seal element;
a second annular seal element;
means mounting said second seal element on said shaft for rotation therewith;
each of said seal elements having a respective mating surface;
means for urging said mating surfaces together to provide rubbing engagement between said mating surfaces during said rotation;
one of said two seal elements being composed of a material having a relatively high hardness;
the other of said two seal elements being composed of a material having a relatively low hardness which allows the harder of the two seal elements to conform the softer seal element to the harder one;
both of said seal elements being composed of a material which will not support an electrochemical reaction;
said mounting means for said seal elements and said respective compositions of the seal elements comprising means for conforming the mating surface of said other seal element to the mating surface of said one seal element, on a macro scale, when said mating surfaces undergo said rubbing engagement, during said rotation;
and means, including the respective composition of each seal element, for substantially eliminating electrokinetic corrosion at said mating surface thereof when the shaft seal is used to prevent leakage of an electrolytic liquid.

2. In the combination of claim 1 wherein said electrolytic liquid is present as an extremely fine film between said mating surfaces, there is an electrokinetic streaming current ($I_s$) in said liquid film during said rotation of said second seal element, said streaming current undergoes localized variations due to micro-irregularities in a seal element's mating surface, and there is a current density ($i_n$) normal to at least one of said mating surfaces, said means for eliminating electrokinetic corrosion comprising:
means for assuring that said normal current density ($i_n$) at said mating surface is supplied virtually entirely by fluid conduction ($i_f$).

3. In the combination of claim 1 wherein:
said one seal element is composed of silicon carbide;
and said other seal element is composed of boron nitride.

4. In the combination of claim 1 wherein said other seal element is composed of a composite material comprising:
a matrix of boron nitride with particles of graphite dispersed in said matrix;
said boron nitride constituting at least 80 wt.% of said composite material.

5. In the combination of claim 4 wherein said composite material contains polytetrafluoroethylene.

6. In the combination of claim 1 wherein said one seal element is selected from a group including silicon carbide, corundum, fused quartz and equivalents thereof.

7. In the combination of claim 1 wherein said two seal elements are non-load-bearing.

8. In the operation of a mechanical shaft seal, located between a rotatable shaft and a shaft housing and provided to prevent the leakage of liquid between said shaft and said housing, wherein said shaft seal includes a stationary first seal element associated with said shaft housing, a second seal element mounted on said shaft for rotation therewith and mating surfaces on each of said seal elements, and wherein said operation comprises urging said mating surfaces together to provide rubbing engagement between said mating surfaces during said rotation of the shaft, a method for preventing electrokinetic corrosion on each mating surface of said shaft seal when said liquid is an electrolytic liquid, said electrolytic liquid being present as an extremely fine film between said mating surfaces, there being an electrokinetic streaming current ($I_s$) in said liquid film during said rotation, said streaming current undergoing localized variations due to micro-irregularities on said mating surfaces, and there being a current density ($i_n$) normal to at least one of said mating surfaces, said method comprising the steps of:
constructing one of said two seal elements out of a material having a relatively high hardness;

constructing the other of said two seal elements out of a material having a relatively low hardness which allows the harder seal element to conform the softer seal element to the harder one;

and assuring that said normal current density ($i_n$) at said one mating surface is supplied entirely by fluid conduction ($i_f$).

9. A method as recited in claim 8 and comprising:

conforming said mating surface of said other seal element to said mating surface of said one seal element, on a macro scale, when said mating surfaces undergo said rubbing engagement.

10. A method as recited in claim 8 wherein:

said one seal element is constructed out of silicon carbide;

and said other seal element is constructed out of boron nitride.

11. A method as recited in claim 8 wherein said other seal element is constructed out of a composite material comprising:

a matrix of boron nitride with particles of graphite dispersed in said matrix;

said boron nitride constituting at least 80 wt.% of said composite material.

12. In a method as recited in claim 11 wherein said composite material contains polytetrafluoroethylene.

13. In a method as recited in claim 8 wherein said one seal element is constructed out of a material selected from a group including silicon carbide, corundum, fused quartz and equivalents thereof.

14. In a method as recited in claim 8 wherein said two seal elements are non-load-bearing.

15. In a method as recited in claim 8 wherein both of said seal elements are constructed out of materials which will not support an electrochemical reaction.

* * * * *